Patented Feb. 11, 1930

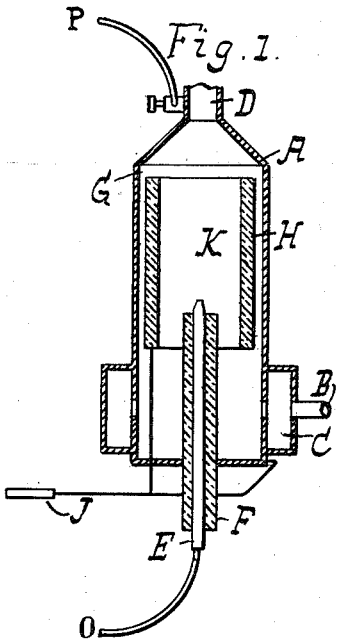
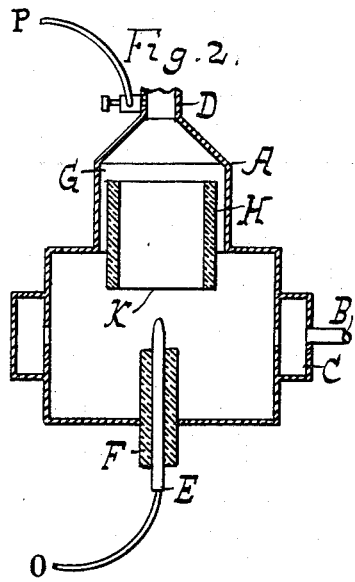
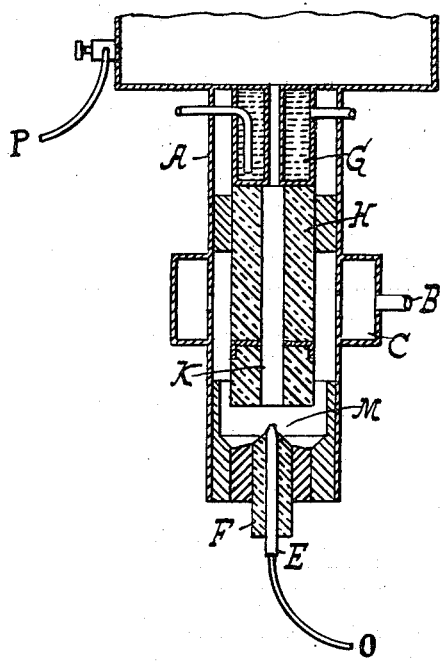

1,746,934

UNITED STATES PATENT OFFICE

PAUL GMELIN, OF MANNHEIM, AND OTTO EISENHUT, OF HEIDELBERG, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

TREATMENT OF HYDROCARBONS WITH ELECTRIC ARCS

Application filed January 24, 1927, Serial No. 163,179, and in Germany January 29, 1926.

When hydrocarbons or gases or vapors containing same, such for example as methane, are treated for the production of valuable unsaturated hydrocarbons, especially acetylene, with an electric arc produced between a central electrode and a surrounding counter electrode, considerable difficulties are experienced in bringing the electric arc to a length favorable for the reaction by means of the gas current alone. Even when tangentially introducing the gases to be treated below the point of the central electrode, the electric arc is inclined to be displaced to a position below the gas introduction with the formation of a short circuit discharge.

We have now found that the said difficulties are overcome and high yields of unsaturated hydrocarbons obtained by employing a central electrode insulated up to its end or substantially so, and bringing the electric arc to a favorable length by means of an insulating layer movably arranged between the two electrodes. As insulating materials for example steatite, quartz, asbestos and the like may be employed. The process can then be carried out without interruption and without any undesirable displacement of the electric arc. The advantage of this working method results in a more complete reaction and in a higher yield of unsaturated hydrocarbons.

It is of particular advantage to work either with direct currents or with alternating currents of high frequency, but alternating currents of usual frequency may also be employed. When working with alternating currents of high frequency, the frequency of which may preferably range between 500 and 150,000, it is advantageous to connect the electrodes in parallel to a resonance oscillatory circuit exactly or about syntonized to the frequency; the tension amplitude of this resonance circuit increases considerably over the usual working tension when the electric arc is inclined to rupture. The adjustment of the said circuit to resonance may be effected for example by altering its capacity. Another method of adjustment is by a suitable variation of the rotation and accordingly of the period number of the electric generator and this method offers the advantage that expensive syntonizing means such as condensers or variometers may be dispensed with. It is often not necessary to exactly syntonize to resonance, but when coming near it as far as possible a sufficient stability though not the highest utilization of the electric arc is obtained.

The accompanying drawings represent diagrammatically some methods of carrying out the present invention in practice. Figures 1, 2 and 3 are vertical sections taken along the vertical axis of electric arc furnaces in which the insulation is arranged in various ways. In the said drawings, A is the metallic mantle of the electric arc furnace which may consist for example of iron and is preferably made of only one piece in order to be sufficiently resistant to the strong thermal action and to prevent the formation of explosive gas mixtures by air having access to the interior of the furnace, and which in view of the high tension danger is connected with the earth by means of the cable P. The introduction of the current to the electrodes is effected by means of the cable O. B represents the supply pipe for the gas introduced into the gas chamber C and into the cavity of furnace K. The gas mixture having undergone the treatment leaves the furnace at D. The internal or central electrode E is provided with the insulation F and connected to the high tension source. The mantle A or a separately arranged counter electrode G is employed as counter electrode. The insulating layer between the electrodes is designated H. By means of the lever J (see Figure 1) the insulation H may be displaced upwards or downwards during the operation and thereby the electric arc is brought to the length most favorable for the reaction. The same result may be obtained by displacing, instead of the insulation J, the central electrode E.

Owing to the electric properties of gases containing hydrocarbons and hydrogen which are entirely different from those of air, it is necessary to employ a strong insulation F of the central electrode up to its extremity or nearly so. However, such insulation may also be effected by a sufficient width of the metallic mantle in which case the insulation F may be considerably shorter as is represented in Figure 2. The width of this part of the furnace must be so chosen that the desired path of the electric arc is the path of smallest electric resistance.

Another method of imparting a sufficient length to the electric arc is illustrated in Figure 3. The electric arc is produced between the central electrode E and the counter electrode G which is provided with a cooler, and passes through the small boring K of the insulating layer H. By means of the said small boring a very high speed of the gas current is produced, for example of 50 metres per second or even more, and owing to the said high speed the electric arc may be lengthened in any desired manner between M and G depending on the length of the boring. The gas or gas mixture introduced into the gas chamber is first passed along the outside of the hot insulating mass and is thereby preheated whereby the yield of valuable products is increased.

As initial material especially methane alone or in mixture with other gases or vapors for example with hydrogen is suitable.

It has been found that the yield in acetylene per kilowatt hour is increased when other saturated or unsaturated hydrocarbon gases or vapors for example ethylene, ethane, mixtures of ethylene and ethane or oil gas and the like are added to the methane. The quantity of such addition may be varied within wide limits. A considerable improvement of the yield is effected for example with an amount of 10 per cent, by volume, of the methane, but it is preferable to employ still greater quantities. Generally it is advantageous to employ the hydrocarbons or hydrocarbon mixtures in mixture with other gases or vapors for example with hydrogen.

The process may be carried out in a simple manner in a cyclic system wherein the hydrogen formed in the reaction is employed over again by separating from the gas leaving the electric arc furnace the unsaturated hydrocarbons formed in the reaction, leading off part of the circulated gas and adding to the residual gas rich in hydrogen fresh hydrocarbons so that it is suitable for being again treated with the arc. The withdrawal and addition of gases must be so controlled that the percentage of hydrocarbon remains sufficiently high to prevent a separation of carbon during the reaction completely or nearly so. It may also be advantageous to lead off part of the reaction gas only after the gas mixture has passed the arc several times.

The hydrogen formed in the process may be removed from the gas mixture also by using it in reduction processes such as hydrogenations, so that a gas suitable for the electric production of unsaturated hydrocarbons is directly obtained. For example the hydrogen formed in the reaction may be caused to act on carbon monoxid and to produce methane which is then treated in the process.

The residual gases obtained in the synthesis of ammonia which are no longer suitable for the said synthesis owing to their high content in methane and argon and which have hitherto either been led away without being utilized or have been burnt for example in boilers, may also be treated according to the present process and thereby acetylene and hydrocyanic acid are obtained. The content of these residual gases in methane may be increased by the addition of for example natural gas and the gases may be employed in a circular course and passed several times through the electric arc, if desired after an addition of methane has been made after separating the reaction product.

For the production of acetylene and hydrocyanic acid according to the present invention also such gases may be employed as have been prepared from gases containing hydrocarbons of any origin which are free from or low in nitrogen by combustion of a portion of such gases with air, or by combustion of the residual gas obtained in the electric arc treatment by means of air, whereby the said gas mixture becomes more or less enriched in nitrogen. A suitable initial gas of this kind is for example the gas mixture containing methane, hydrogen and small quantities of nitrogen obtained by the destructive hydrogenation of coal, tar, mineral oils and the like. Coke oven gas may also be employed for this purpose.

The following examples will further illustrate how our invention may be carried out in practice, but the invention is not restricted to these examples.

*Example 1*

When working an electric arc furnace of the kind shown in Figure 1 without the insulation H and passing a mixture of methane and hydrogen therethrough, a gas mixture containing from 2 to 3.5 per cent of acetylene is obtained. The yield in acetylene amounts to 55 to 65 litres per kilowatt hour. When drawing the electric arc upwards by suitably arranging the insulating material H at the inside of the counter-electrode, the concentration of acetylene is increased to 3 to 8 per cent or even more and the yield is 70 to 90 litres per kilowatt hour.

*Example 2*

A mixture of methane and hydrogen with 30 per cent of methane and 70 per cent of hydrogen is passed through an electric arc furnace of the kind described above. In another experiment a mixture containing 15 per cent of methane, 15 per cent of ethylene and 70 per cent of hydrogen and in a third test a mixture of 30 per cent of ethylene and 70 per cent of hydrogen is passed therethrough. In the first instance 70 to 90, in the second instance 100 to 110 and in the third instance 110 to 140 litres of acetylene are formed per kilowatt hour.

*Example 3*

In the manufacture of acetylene and hydrogen from methane in an electric arc furnace of the above described type, a gas mixture is caused to circulate which before entering the electric arc consists for example of 20 per cent of methane and 80 per cent of hydrogen. After having left the arc the gas contains besides small quantities of other unsaturated hydrocarbons about 6 per cent of acetylene and the rest consists of hydrogen and methane. After removing the acetylene and the bulk of the other reaction products by absorption in acetone, about 18 per cent of the remaining gas is removed from the circular course which amount corresponds to the increase in volume due to the formation of hydrogen in the reaction. Thereupon so much of methane is added that a mixture of hydrogen and methane corresponding to that initially employed is formed and this mixture is passed again through the arc.

*Example 4*

The residual gas obtained in the synthetic manufacture of ammonia and containing besides nitrogen and hydrogen from 7 to 10 per cent of methane and 15 per cent of argon is mixed with from 5 to 10 per cent of methane. When treated in an electric arc in the manner described above a gas mixture containing acetylene and hydrocyanic acid is obtained. The yield amounts to 50 to 60 litres of acetylene and 15 to 18 grammes of hydrocyanic acid per kilowatt hour.

*Example 5*

Waste gases resulting from the destructive hydrogenation of coal and containing about 30 per cent of methane, 20 per cent of nitrogen and 50 per cent of hydrogen besides small quantities of other constituents are passed through the electric arc in the manner described above. About 50 litres to 60 litres of acetylene and 15 to 18 grammes of hydrocyanic acid are formed per kilowatt hour. Some methane remains undecomposed.

We claim:

1. In an electric arc furnace the arrangement of a central electrode insulated substantially up to its extremity and of an insulating layer movably arranged between the central electrode and a surrounding electrode.

2. An electric arc furnace comprising a central electrode, a counter electrode, a metallic wall surrounding the said counter electrode, said central electrode being insulated substantially up to its extremity, and insulating means between the said central electrode and those parts of the counter electrode and metal wall surrounding the counter electrode which are so near to the central electrode that they would cause undesirable discharges.

In testimony whereof we have hereunto set our hands.

PAUL GMELIN.
OTTO EISENHUT.